(12) United States Patent
Minnich (10) Patent No.: US 10,085,595 B2
(45) Date of Patent: *Oct. 2, 2018

(54) GRILL ACCESSORY FOR PROVIDING FOOD ACCESS AND MAINTAINING AIRFLOW CONTROL

(71) Applicant: Camander, Inc., Atlanta, GA (US)

(72) Inventor: Cortlandt Minnich, Atlanta, GA (US)

(73) Assignee: Camander, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/843,632

(22) Filed: Dec. 15, 2017

(65) Prior Publication Data

US 2018/0103799 A1  Apr. 19, 2018

Related U.S. Application Data

(63) Continuation of application No. 15/209,133, filed on Jul. 13, 2016, now Pat. No. 9,883,771.

(60) Provisional application No. 62/191,636, filed on Jul. 13, 2015.

(51) Int. Cl.
*A47J 37/07* (2006.01)
*F24B 3/00* (2006.01)
*A23L 5/10* (2016.01)

(52) U.S. Cl.
CPC ............ *A47J 37/0786* (2013.01); *A23L 5/17* (2016.08); *A47J 37/0763* (2013.01); *F24B 3/00* (2013.01)

(58) Field of Classification Search
CPC ...... A47J 37/0786–2037/0795; A47J 37/0763; A47J 37/0754; A23L 5/17; F24B 3/00

USPC ............ 426/523; 99/450, 473–473, 480, 340
See application file for complete search history.

(56) References Cited

U.S. PATENT DOCUMENTS

| | | | |
|---|---|---|---|
| 2,001,285 A | 5/1935 | Rehm | |
| 2,645,993 A | 7/1953 | Voss | |
| 2,921,577 A | 1/1960 | Smith | |
| 3,041,959 A | 7/1962 | Oyler | |
| 3,087,414 A | 4/1963 | Gannon | |
| 3,224,357 A | 12/1965 | Rubens | |
| 3,327,617 A | 6/1967 | Harlett | |
| 4,210,119 A | 7/1980 | Kincaid | |
| 4,476,848 A | 10/1984 | Protas | |
| 4,535,753 A | 8/1985 | Zayauskas | |
| 5,768,977 A | 6/1998 | Parris et al. | |
| 6,016,797 A | 1/2000 | Nowicke | |
| 6,038,964 A * | 3/2000 | Sikes | A47J 37/07 126/25 R |
| 8,176,841 B2 | 5/2012 | Hatjopoulos et al. | |
| 8,783,242 B1 * | 7/2014 | Banas | A47J 37/079 126/223 |
| 9,289,097 B2 | 3/2016 | Contarino, Jr. | |
| 9,883,771 B2 * | 2/2018 | Minnich | A47J 37/0786 |

(Continued)

*Primary Examiner* — Drew E Becker
(74) *Attorney, Agent, or Firm* — Troutman Sanders LLP; James E. Schutz; Christopher C. Close, Jr.

(57) ABSTRACT

The disclosed technology includes a grill accessory for use with a kamado-style grill to enable a user to control the flow of heat throughout the grill and maintain temperature of the cooking chamber. The grill accessory may enable a user to control the flow of heat throughout the grill, providing the user with greater customization of cooking options. The grill accessory may further enable a user to visually inspect a cooking food item while reducing the amount of heat loss from the grill.

16 Claims, 11 Drawing Sheets

(56) References Cited

U.S. PATENT DOCUMENTS

| | | | |
|---|---|---|---|
| 2003/0015188 A1* | 1/2003 | Harbin | A47J 37/0754 126/25 R |
| 2006/0191528 A1* | 8/2006 | Spangrud | A47J 37/0713 126/275 R |
| 2008/0272263 A1* | 11/2008 | Macken | A47J 37/0786 248/351 |
| 2010/0083947 A1 | 4/2010 | Guillory et al. | |
| 2010/0258106 A1 | 10/2010 | Simms, II | |
| 2011/0214662 A1 | 9/2011 | Contarino | |
| 2013/0319258 A1* | 12/2013 | Cleveland | A47J 37/04 99/421 R |
| 2014/0130788 A1 | 5/2014 | Contarino, Jr. | |
| 2014/0196609 A1 | 7/2014 | Snyman | |
| 2014/0251160 A1 | 9/2014 | Contarino, Jr. | |
| 2016/0227965 A1 | 8/2016 | Johnston et al. | |
| 2017/0020337 A1* | 1/2017 | Borovicka | A47J 37/0786 |

* cited by examiner

GRILL ACCESSORY FOR PROVIDING FOOD ACCESS AND MAINTAINING AIRFLOW CONTROL

CROSS-REFERENCE TO RELATED APPLICATIONS

This application is a continuation of U.S. Non-Provisional patent application Ser. No. 15/209,133, filed 13 Jul. 2016, which issued as U.S. Pat. No. 9,883,771 on 6 Feb. 2018, which claims priority to, and the benefit under 35 U.S.C. § 119(e), of U.S. Provisional Patent Application No. 62/191,636, filed 13 Jul. 2015, the entire contents and substance of which are hereby incorporated by reference as if fully set forth below.

TECHNICAL FIELD

Aspects of the present disclosure relate to baking and grilling apparatuses, and, more particularly, apparatuses for converting an ovoid grill into a pizza oven.

BACKGROUND

Grills, such as, for example, ovoid-shaped kamado-style grills, are used to cook various food types inside of a chamber that is heated by combustion. Kamado grills (or ovens) are particularly popular for their ability to maintain temperature. Kamado grills allow users to regulate or control the temperature using airflow control devices on the top and at or near that bottom of the grill. Such airflow control devices allow the user to control the oxygen to the fire, which in turn allows the user to regulate temperature. Kamado grills take advantage of their chimney shape to draw air under pressure to the fire. Kamado-style ovens that are run with fully open vents can produce temperatures of over 1000° F.

Kamado-style grills are limited, however, because the lid continually and repeatedly must be opened to add, remove, or check food. Each time the lid is opened, heat escapes. Accordingly, the temperature inside the cooker fluctuates greatly while the food is cooking, which yields an inferior product. Further, a user unnecessarily wastes fuel as the grill returns to the desired temperature each time the grill is opened and then closed. Many propose devices that provide an opening to the cooking chamber, but such openings provide no air restriction and therefore defeat the goal of temperature control.

BRIEF OVERVIEW

Aspects of the disclosed technology generally provide a grill accessory for providing food access and maintaining airflow control. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may be inserted in between a lower portion and a lid of a grill (alternatively, inserted into a grill), such as, for example, a kamado style or other round, domed, or ovoid-shaped grill. Such embodiments may serve as, for example, a oven for baking foods such as pizza, bread, naan, or other such foods. Some embodiments of the disclosed technology may comprise a door that opens and closes to enable users to load, check, turn, and remove a food item (e.g., a pizza) for cooking, baking, or grilling, while generally maintaining the internal temperature of the oven. Additionally, embodiments of the present disclosure may include airflow control devices (i.e., adjustable vents) that allow users to adjust the internal temperature of the oven and provide users precise temperature control. In some embodiments, the airflow control devices may work in tandem with one or more air vents near the bottom of a kamado-style grill to draw air up through the fire at the bottom of the grill, over the surface of the cooking food item, and out the grill through the airflow control devices.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE FIGURES

Reference will now be made to the accompanying figures, which are not necessarily drawn to scale, and wherein.

DETAILED DESCRIPTION

The present disclosure can be understood more readily by reference to the following detailed description of example embodiments and the examples included herein. Before the example embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose. In some instances, the disclosure may refer to a "grill," but when referring to the interior of the grill, the disclosure may refer to a "cooking chamber" or an "oven." It is intended throughout that the terms be used interchangeably unless specifically described otherwise, and use of one term is intended to invoke the other.

To facilitate an understanding of the principles and features of the embodiments of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the invention, for example.

Embodiments of the disclosed technology include a grill accessory for use with a grill. In various embodiments, a grill accessory may inserted into a partially open grill, such as for example, a kamado-style grill. Put differently, a grill accessory may be inserted in between a lower portion of a kamado-style grill and the kamado-style grill's lid. The walls of the grill accessory may substantially fill the gap created by partially opening the grill, creating a completely continuous, or substantially completely continuous, outer surface comprising the grill and grill accessory inserted into the grill. The continuous outer surface of the grill and grill accessory may serve to prevent heat from escaping from the grill in a manner similar to the grill remaining closed and being used without the grill accessory. As will be appreciated, in many applications, maintaining internal grill temperature can provide a more pleasing and consistent finished product.

The grill accessory may include a body extension that extends outward from the front surface of the grill. The body extension may comprise an enclosure having a hinged door providing access to the inside of the enclosure, and further to the inside of the grill (i.e., the cooking chamber) and to the cooking surface inside the grill. The door may allow a user to selectively open and close the enclosure to enable the user to place a food item into the cooking chamber. The body extension may include one or more airflow controls. Furthermore, the grill may also include one or more airflow controls. In some embodiments, when inserted into the grill, the grill accessory and grill may create a substantially airtight chamber. Thus, the airflow controls of the grill accessory and/or the grill may be used individually or collectively to direct the flow of heat throughout the grill. Accordingly, the grill accessory may allow a user to direct and control the heat flow through the cooking chamber (i.e., the interior of the grill) in a manner that may, for example, direct the heat to flow upward from the base of the grill, laterally across the midsection of the grill (and a food item present on the cooking surface or grate) and out of the front of the grill accessory. Thus, the grill accessory, which creates a substantially airtight cooking chamber when paired with a kamado-style grill, may enable a user to modify a kamado-style grill to better cook food items, such as pizza, by controlling the airflow to draw hot air across the surface of the food items and maintaining consistent temperature within the cooking chamber.

Throughout this disclosure, certain embodiments are described in exemplary fashion in relation to a grill accessory for use with a kamado-style grill to, for example, cook a pizza. But embodiments of the disclosed technology are not so limited. In some embodiments, the disclosed device and methods may be effective for use with grills of other shapes and sizes, and may further be used to cook many different types of food items.

Referring now to the drawings, FIGS. 1A-1H illustrate various views of example embodiments of a grill accessory 100. In some embodiments, a grill accessory 100 may comprise a body 120 for insertion into a grill and a body extension 130 for providing access to the internal chamber of the grill (i.e., the cooking chamber) and enabling a user to control the airflow of the grill in combination with the grill accessory 100. The body extension 130 may include one or more airflow control devices 115 for controlling airflow. The body extension may further include a door 110 that may be selectively opened and closed to provide access to the internal chamber of the grill. According to some embodiments, the grill accessory 100 may be constructed of a heat-resistant material such as for example, but not limited to, aluminum, steel, cast iron, ceramic, certain fibers and plastics/resins or other materials resistant up to, for example, a temperature of 1200° F. These materials may be welded, bent, cast, pressed, or assembled into a shape configured to mate with a grill as described herein. In some embodiments, with the exception of moving parts such as the door 110 and airflow control devices 115, a grill accessory 100 may be constructed of a single piece of material that is cast or molded. According to certain embodiments, a cross section of a grill accessory may be an I-channel, Z-channel, C-channel, or other suitable configuration.

According to some embodiments, the body 120 and the body extension 130 may be connected to form one continuous piece. For example, portions of the body 120 and body extension 130 may be welded, screwed, bolted, adhered, or otherwise connected together. In some embodiments, the outer surfaces of the grill accessory 100 may be substantially continuous such that when the grill accessory is in use with a grill, the grill accessory 100 and the grill itself may provide a substantially continuous outer surface such that are no holes or gaps (with the exception of an open door 110 or an open airflow control 115) that would allow heat to easily escape from the internal chamber of the grill. Accordingly, as will be appreciated, embodiments of the grill accessory 100, when paired with a grill, may form a substantially airtight cooking chamber.

The body 120 may have any shape that substantially occupies the open space along the outer surface of the grill that is created when the grill lid is partially opened. A body 120 that is so situated substantially prevents air and/or heat from escaping the grill when the grill accessory 100 is in use with the grill. For example, an embodiment of a grill accessory 100 for use with an ovoid grill may have body 120 that is generally ringed-shaped, wherein the ring has height that tapers downwards from a first height at the front of the body 120 to a second height at the rear of the body 120, as shown in FIGS. 1A-1H. As shown in FIG. 1E, a substantially ringed-shaped body 120 does not have to be rounded, but may be made up of a plurality of straight-edged walls that are configured in a generally rounded shape. In some embodiments, a ring-shaped body 120 may be unbroken (i.e., continuous) across the rear portion of the body 120. A ring-shaped body 120 having an unbroken rear portion may allow the body 120 to fill the gap between one or more hinges of the grill lid to prevent air and/or heat from escaping the grill through the space between the one or more grill hinges, thus providing a more substantially airtight cooking chamber.

The body 120 may have a top surface 122 and a bottom surface 124 that are connected together by one or more sidewalls disposed between the top surface 122 and bottom surface 124. According to some embodiments, the bottom surface 124 may be configured to securely engage (i.e., rest on top of or mechanically communicate with) an upper rim of a lower portion of a grill. In some embodiments, when engaged with the upper rim of the lower portion of the grill, the bottom surface 124 may substantially create a seal with the upper rim of a lower portion of a grill to prevent air from flowing out of the grill between the grill accessory and the bottom portion of the grill. Furthermore, in some embodiments, the top surface 122 may be configured to receive (i.e., support or mechanically communicate with) a lower rim of a hinged lid of the grill. According to some embodiments, when the hinged lid of the grill is lowered onto the top surface 122 of the body 120 of the grill accessory 100, the rim or lower surface of the hinged lid may come into contact with the top surface 122 of the body 120 such that the lid is supported by the body 120 of the grill. In some embodiments, the top surface may be configured to substantially provide a seal with the rim of the hinged lid when engaged with the rim of the hinged lid, to prevent (or substantially reduce) heat or air from escaping the grill. Furthermore, the body 120 of the grill accessory 100 may support the weight of the lid of the grill.

When partially opened, a hinged lid of a grill will generally create a wedge-shaped gap in the grill. Accordingly, in some embodiments, as shown in FIG. 1H, the height of the body 120 may taper downwards from a first height at a front portion of the body 120 to a second height at a rear portion of the body 120 such that the body 120 can substantially fill the wedge-shaped gap. Accordingly, as shown in FIG. 1H, in some embodiments, the body 120 may be wedge-shaped when viewed from the side. In some embodiments, the first height (e.g., at the front of the grill) may be a maximum height of the body 120 and the second height (e.g., at the rear of the grill) may be a minimum height of the body 120. According to some embodiments, the maximum height may be at a first location of the body 120 and the minimum height may be at a second location of the body 120, wherein the first and second locations are positioned approximately 180 degrees apart.

Figure 1A:
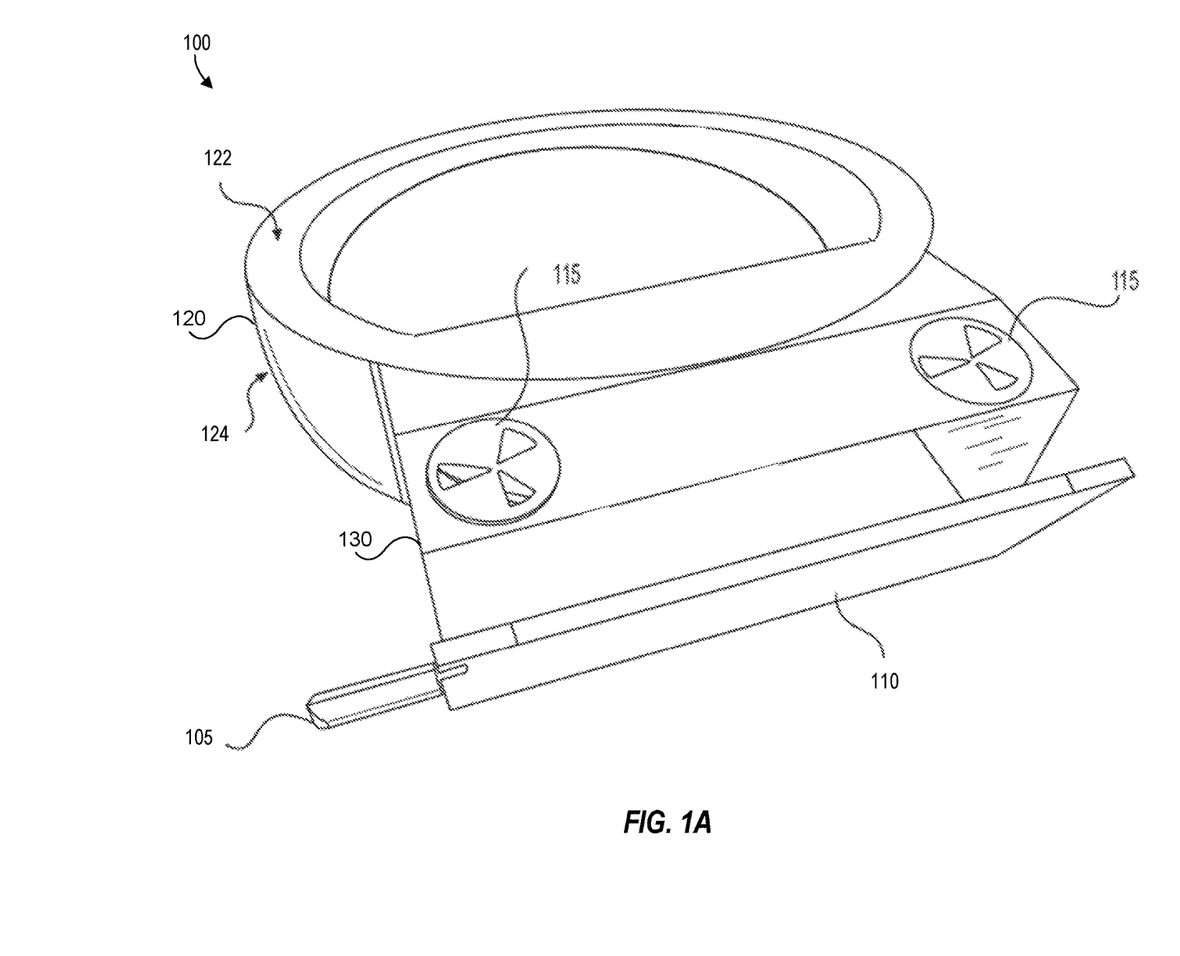
FIG. 1A is a perspective view of a grill accessory, in accordance with an example embodiment of the presently disclosed subject matter.
Figure 1B:
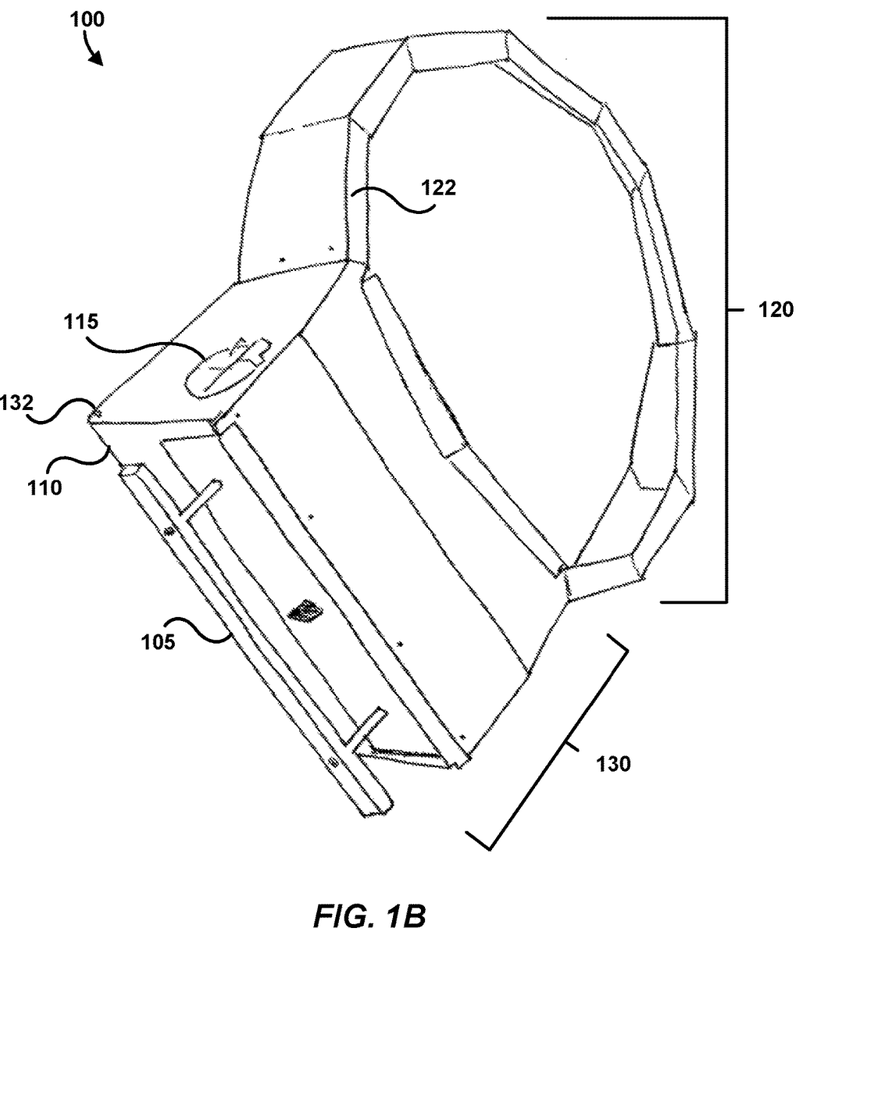
FIG. 1B is another perspective view of a grill accessory, in accordance with an example embodiment of the presently disclosed subject matter.
Figure 1C:
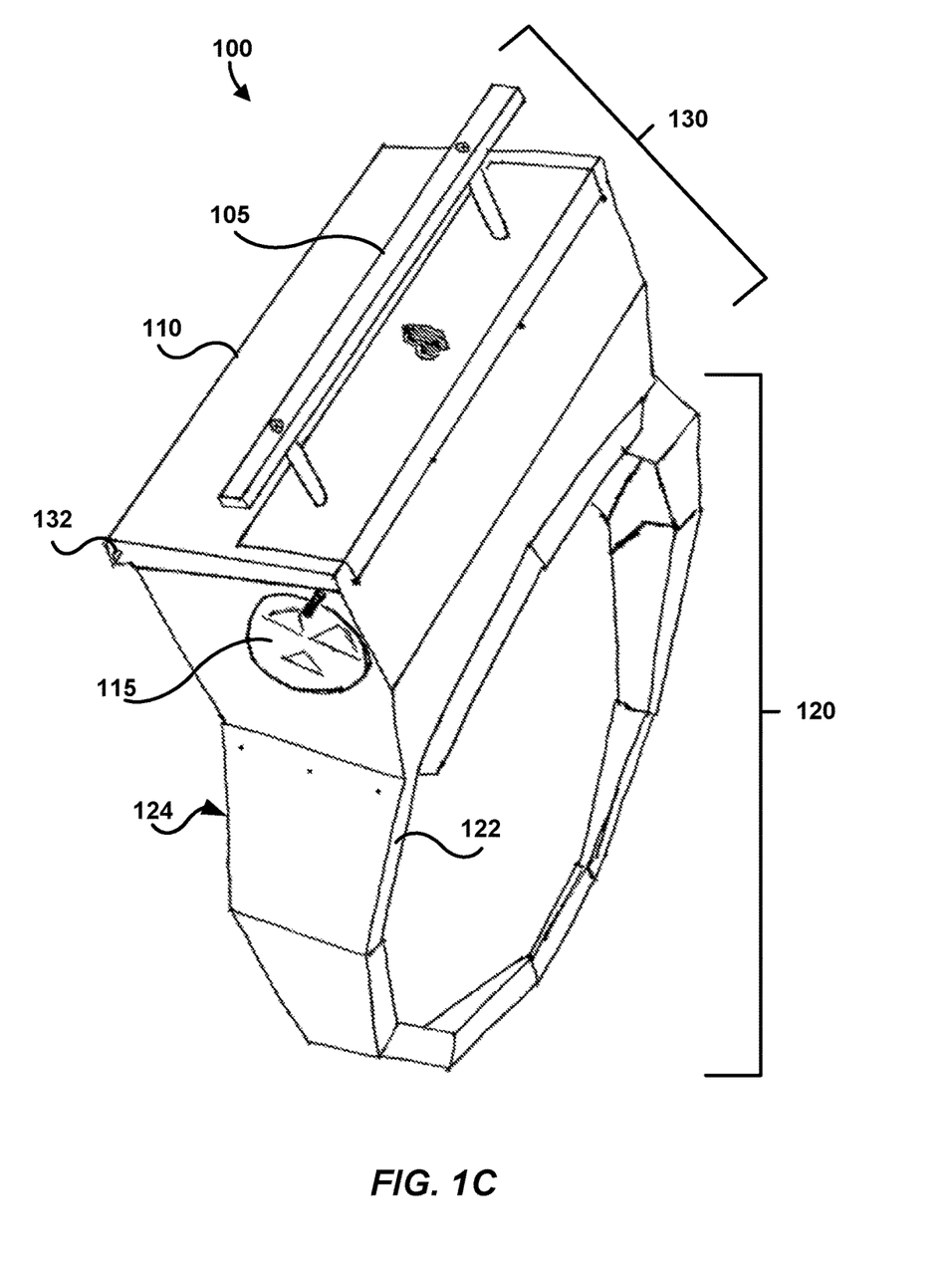
FIG. 1C is another perspective view of a grill accessory, in accordance with an example embodiment of the presently disclosed subject matter.
Figure 1D:
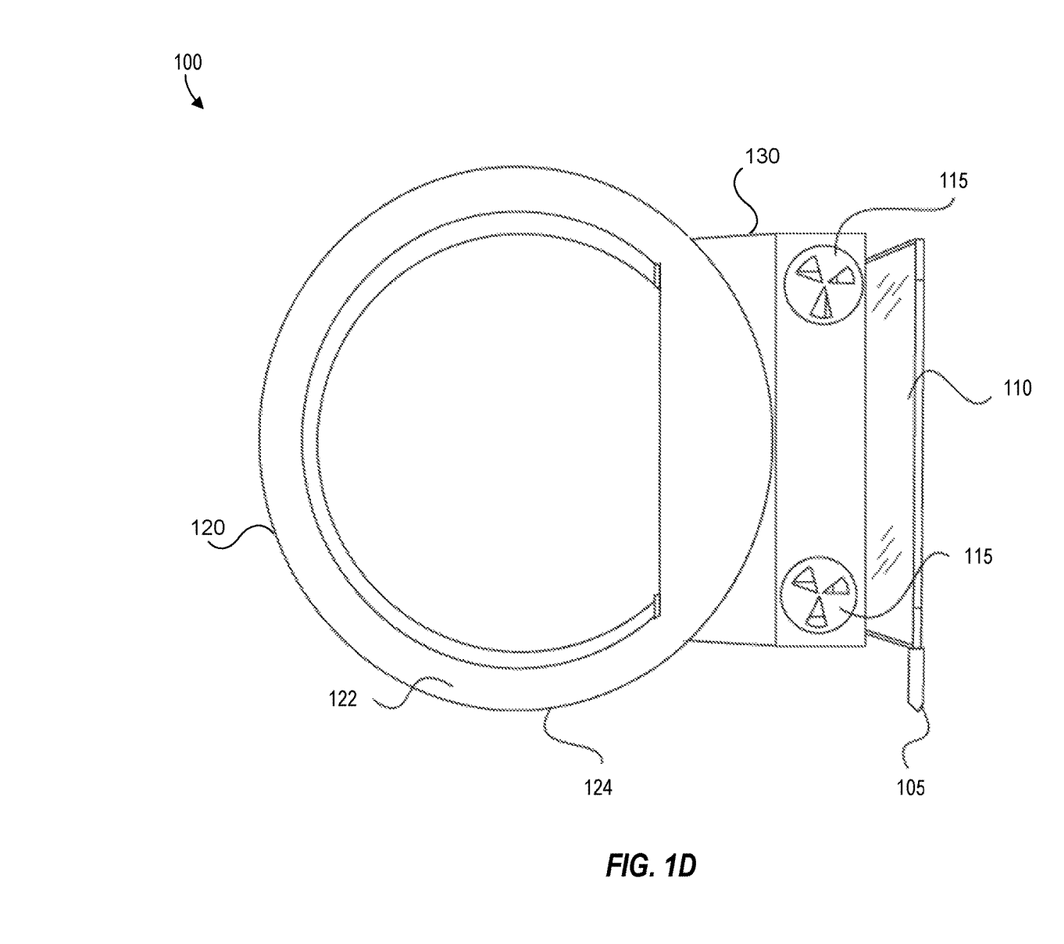
FIG. 1D is a top view of a grill accessory with a partially open door, in accordance with an example embodiment of the presently disclosed subject matter.
Figure 1E:
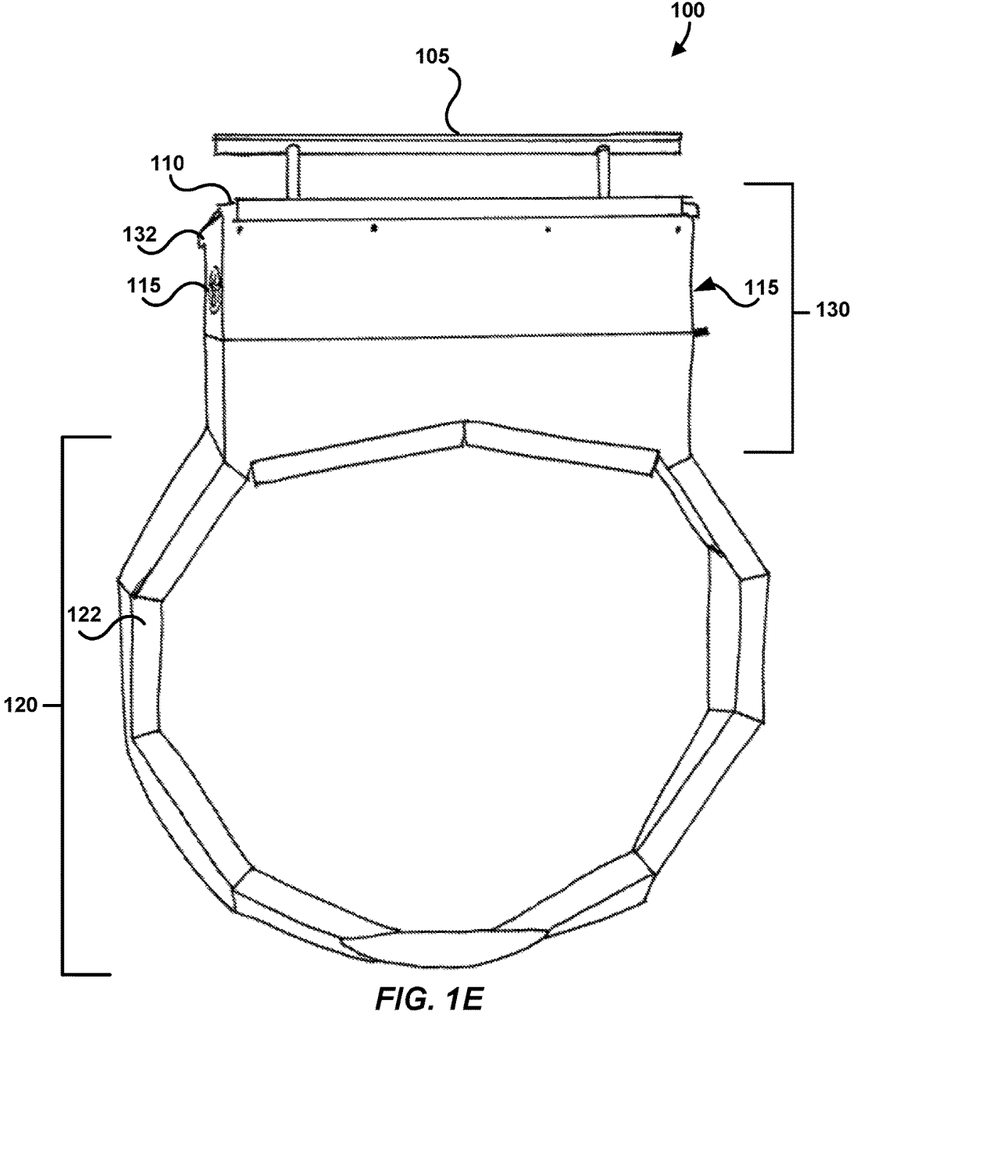
FIG. 1E is another top view of a grill accessory with a closed door, in accordance with an example embodiment of the presently disclosed subject matter.
Figure 1F:
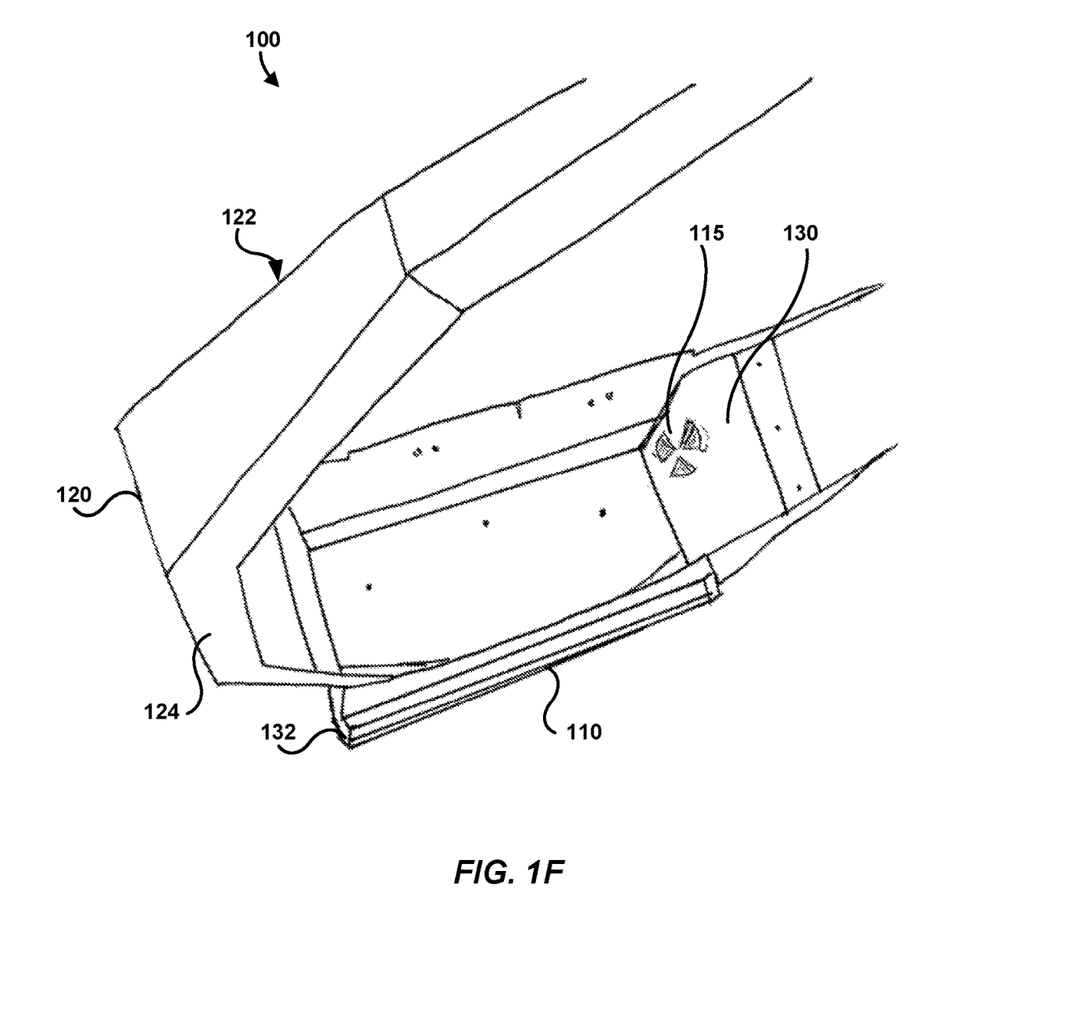
FIG. 1F is a rear perspective view of a grill accessory, in accordance with an example embodiment of the presently disclosed subject matter.
Figure 1G:
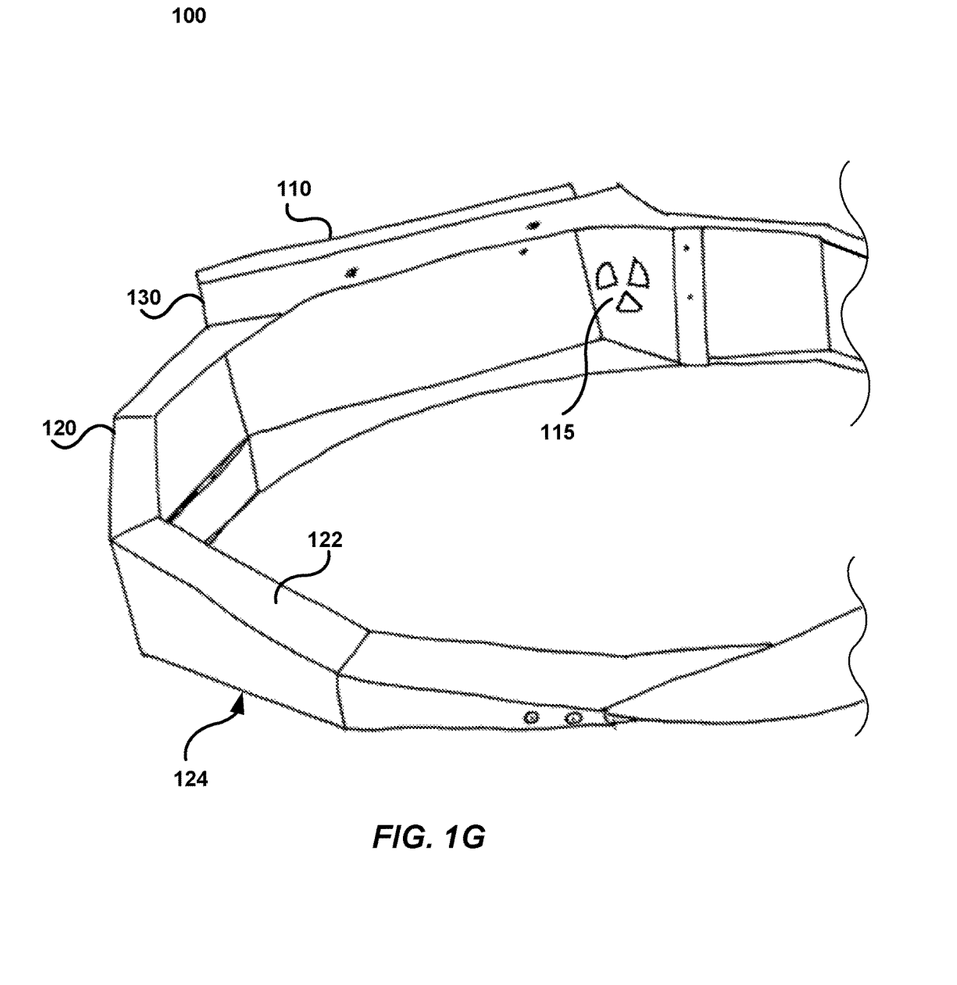
FIG. 1G is another rear perspective view of a grill accessory, in accordance with an example embodiment of the presently disclosed subject matter.
Figure 1H:
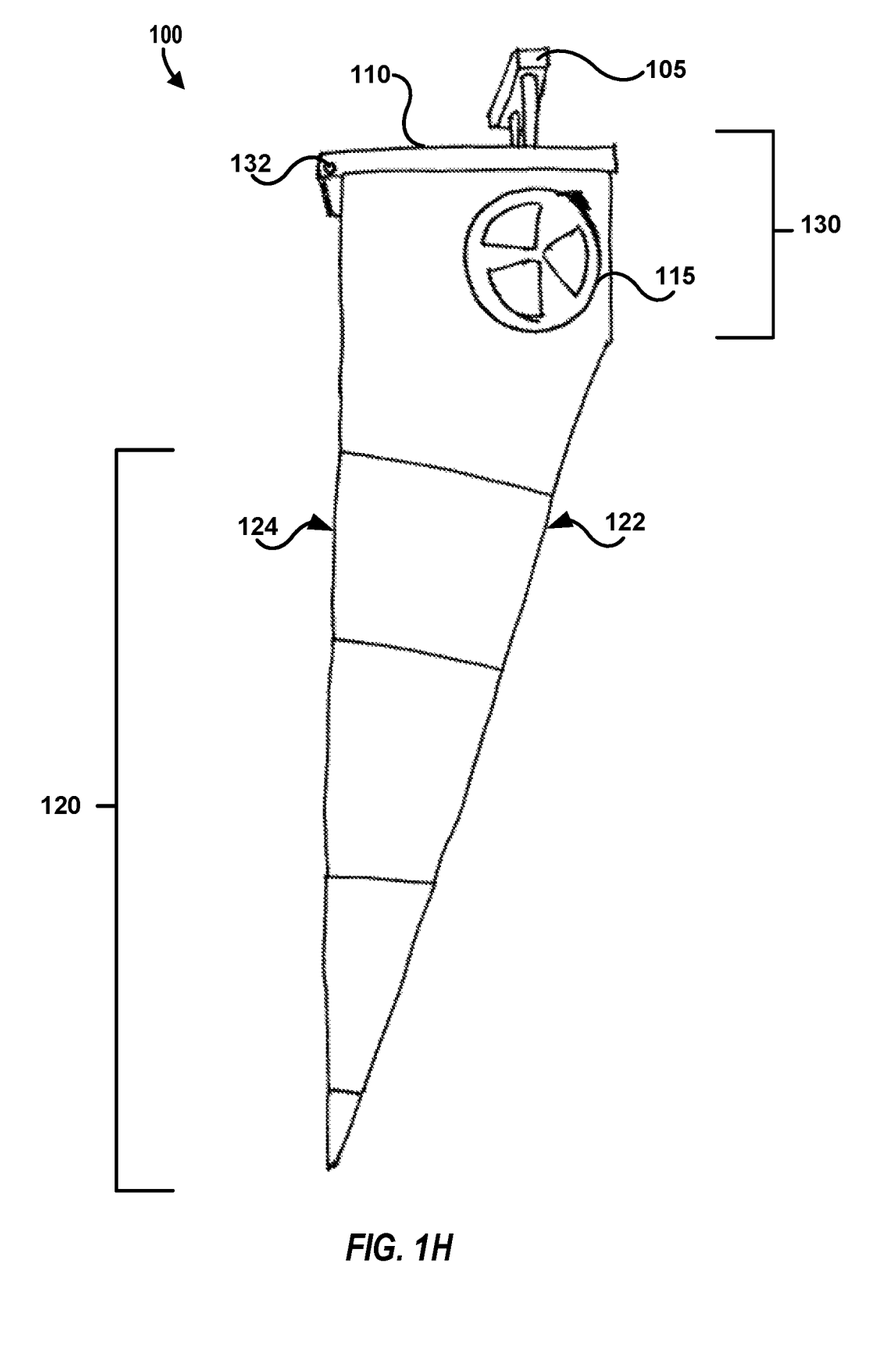
FIG. 1H is a side view of a grill accessory, in accordance with an example embodiment of the presently disclosed subject matter.

As shown in FIGS. 1A-1H, according to some embodiments, a body extension 130 may extend outward from the body 120 of the grill accessory 100. In some embodiments, the body extension 130 may connect to the body 120 at a portion of the body 120 where the height of the body 120 is at its maximum. In some embodiments, the body extension 120 may have the same height as the maximum height of the body 120. According to some embodiments, the body extension 120 may have a height that is greater than the maximum height of the body 120. For example, as shown in FIG. 1C, the body extension 120 may include a first top surface that inclines upward away from the body 120 before connecting to a second top surface that is configured to be substantially parallel to the ground when the grill accessory 100 is in use with a grill. In some embodiments, the first top surface that inclines upward away from the body 120 may also be configured to receive a portion of the lower rim of the grill lid when in use with the grill, thus providing a seal (or substantial seal) to prevent heat or air from escaping from the interior of the grill.

As shown in FIGS. 1A-1H, in some embodiments, the body extension 130 may have one or more top surfaces, a bottom surface, a first and second side surface, and a front surface forming an enclosure with a rear face that is open to the cooking chamber. The open rear face may provide access to the interior of a grill and cooking surface when the grill accessory 100 is in use with the grill. In some embodiments, the body extension 130 may be generally box-shaped. According to some embodiments, the enclosure is generally airtight and may serve to prevent (or substantially reduce) heat escaping from the cooking chamber.

Figure 2:
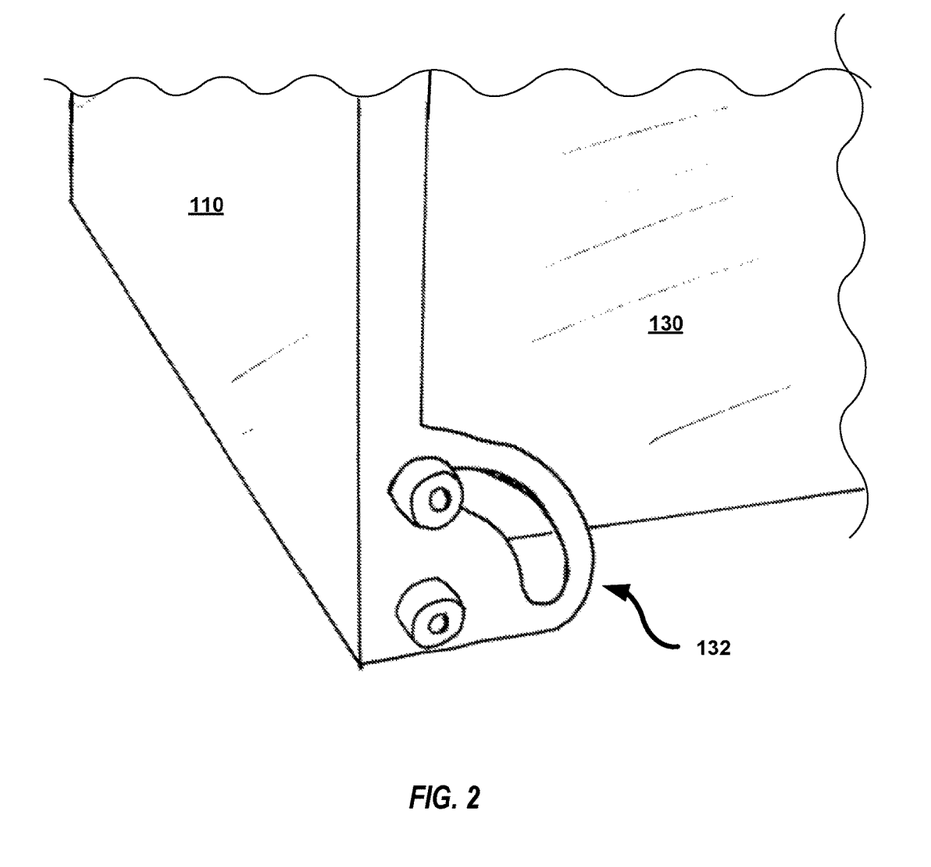
FIG. 2 is a perspective view of a door hinge of a grill accessory, in accordance with an example embodiment of the presently disclosed subject matter.

In some embodiments, the front surface of the body extension 130 may be or include a door 110 that may be selectively opened and closed to provide access to the inside of the enclosure formed by the body extension 130 and may further provide access to the inside of the grill. As shown in FIG. 2, in some embodiments, the door 110 may be connected to the bottom surface of the body extension 130 by hinges 132, such that the door 110 may be rotatably lowered to an open position. The door 110 may include a handle 105 that can be used to open the door 110 without contacting the front surface of the body extension 130, which may be hot to the touch when in use with an active grill. In some embodiments, as shown in FIG. 1A, a handle 105 may be a lever that extends out of the side of the door 110. The handle 105 may generally span the width of the door 110 or it can be offset to one side of the door 110. Alternatively, in some embodiments, a handle 105 may extend outward from both sides of the door 110. In some embodiments, as shown in FIG. 1B, a handle 105 may be attached to the front face of the door 110. The gripping portion of a handle may be made of wood to reduce the transfer of heat from the body extension 130 to the handle 105 when the grill is in use, thereby preventing a user from burning themselves when engaging the handle 105.

It will be understood that the door 110 described herein is merely an example embodiment, and those having skill in the art will appreciate there may be many different configurations or mechanisms known in the art for creating a door. For example, the door 110 could be hinged at the top surface of the body extension such that it rotates upwards, or the door 110 may be hinged on a side surface of the body extension 130 such that it rotates laterally like a conventional car door. Further still, in some embodiments, the door 110 may be split into multiple hinged portions such that, for example, a first half of the door 110 may be opened while the second half remains closed. In some embodiments, the body extension may include a latch or other securing mechanism to secure the door 110 when the door 110 is shut. As shown in FIGS. 1B and 1C, according to some embodiments, the door 110 may include a heat shield disposed on the front of the grill between the front of the door 110 and the handle 105 to further reduce the risk of a user burning his or her hand when opening and closing the door.

According to some embodiments, the body extension 130 may include a locking mechanism that, when activated, securely locks the door 110 in a closed position. This locking mechanism may be useful in transporting the grill accessory 100. For example, when the door 110 is securely locked, a handle 105 extending out of the front surface of the body extension 130 may be used to conveniently carry the grill accessory 100 in a manner similar to a suitcase.

In some embodiments, the grill accessory 100 may include one or more airflow control devices 115. For example, in some embodiments, an airflow control device 115 may be a vent that can be manipulated by a user to adjust the vent to varying degrees of open and closed. For example, as shown in FIGS. 1A-1H, an airflow control device 115 may comprise rotatable circular panel having one or more apertures that align with one or more apertures of a surface of the grill accessory 100 when open, and having one or more surfaces that obstruct the one or more apertures of the surface of the grill accessory 100 when closed. In such embodiments, the rotatable panel may further include a protrusion extending outward away from the surface of the grill accessory 100 that may serve as a grip to rotate the circular panel. It will be understood that the vent described herein is merely exemplary, and those of skill in the art will recognize that a variety of airflow control devices 115 that may serve the same purpose as the vent described herein may alternatively be used with the grill accessory 100.

According to some embodiments airflow control device 115 may be entirely closed, entirely opened, or partially opened. When entirely opened, an airflow control device 115 may present a maximum opening for air to flow out of the interior of the grill. When entirely closed, an airflow control device 115 may substantially prevent any air from flowing out of the grill through the airflow control device 115. According to some embodiments, an airflow control device 115 may be continuously adjustable to any partially open position between a minimum opening and a maximum opening. In some embodiments, an airflow control device 115 may be discretely adjustable to one or more positions corresponding to different degrees of being partially open.

According to some embodiments, as shown in FIG. 1A, one or more airflow control devices 115 may be positioned on the top surface of the body extension 130 such that when opened, the airflow control device 115 may allow air and/or heat to exit from the interior of the grill through the top surface of the body extension 130. In some embodiments, as shown in FIG. 1B, one or more airflow control devices 115 may be positioned on one or more side surfaces of the body extension 130 such that when opened, the airflow control device 115 may allow air and/or heat to exit from the interior of the grill through the side surface(s) of the body extension 130. In some embodiments, one or more airflow control devices 115 can be placed on the door 110 of the body extension 130. As will be appreciated, an advantage of positioning the airflow control devices 115 on the body extension 130 (i.e., lower than the height of the grill lid (i.e., dome) is that it can maximize heating of the air and dome/lid material, which aids in the balance of top and bottom cooking of the food item through both convection and radiant heat from the dome/lid above the food item.

Figure 3:
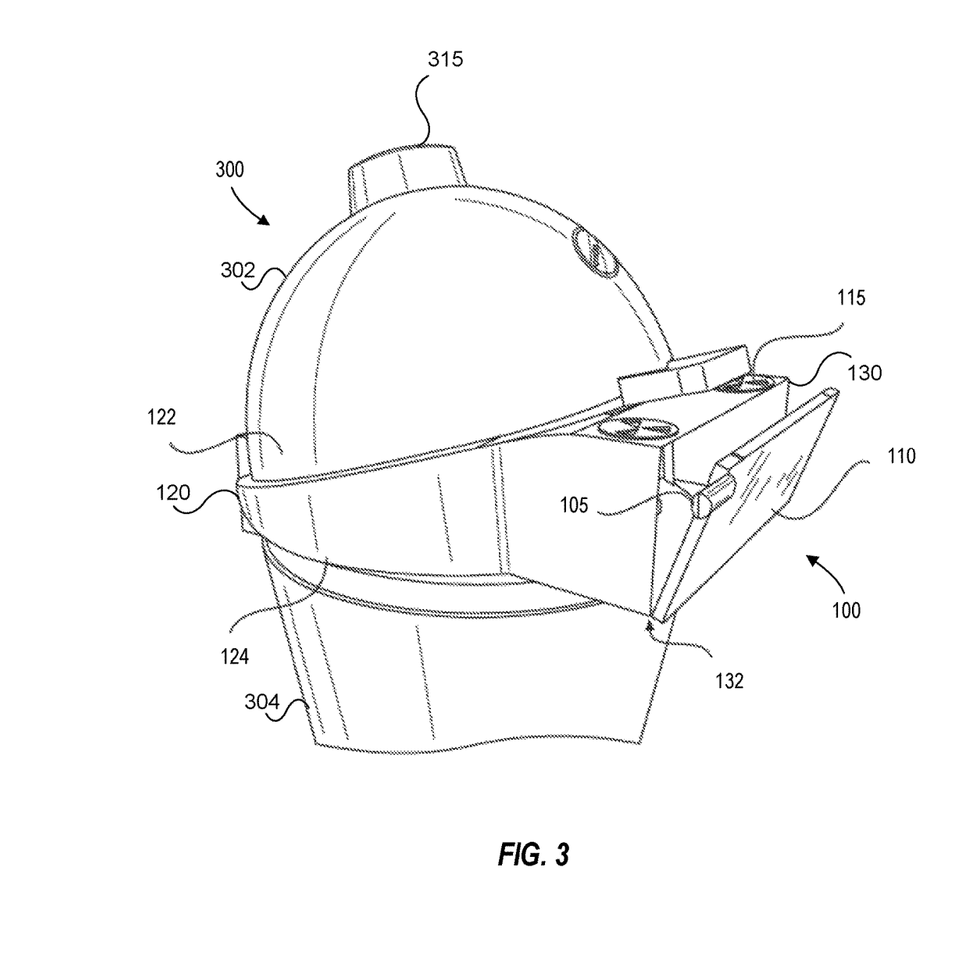
FIG. 3 is a perspective view of a grill accessory in use with a kamado-style grill, in accordance with an example embodiment of the presently disclosed subject matter.

FIG. 3 shows an embodiment of a grill accessory 100 in use with a kamado-style grill 300. As shown, a kamado-style grill 300 may have a grill lid 302 that is attached to a lower portion 304. Typically, a grill lid 302 is attached to the lower portion 304 by one or more hinges positioned at the rear of the grill 300 (i.e., the grill lid 302 is hingeably attached to the lower portion 304). According to some embodiments, a grill accessory 100 may be used with a grill 300 by lifting up the grill lid 302 from a closed position to an open or partially open position, inserting the grill accessory 100 into the gap formed when the grill lid 302 is open, positioning the bottom surface 124 of the body 120 of the grill accessory 100 onto a rim of the lower portion 304 of the grill 300, and closing the grill lid 302 onto the top surface 124 of the body 120 such that a rim of the grill lid 302 engages the top surface 124. As shown in FIG. 3, once in place, the outer surfaces of the grill accessory 100 may substantially fill in the gap in the outer surface of the grill 300 created by opening the grill lid 302. In some embodiments, the grill accessory 100 may be configured to substantially create a seal between the bottom surface 124 of the body 120 and the rim of the lower portion 304 of the grill 300, as well as the top surface 122 of the body 120 and the rim of the grill lid 302. These seals may prevent air and/or heat from exiting the interior of the grill about the edges of the grill accessory 100 and allow the user to more precisely control the temperature in the cooking chamber.

As shown in FIG. 3, a door 110 may be selectively opened to allow a user to insert a food item onto the upper face of the lower surface of the body extension or onto a grate positioned generally in the center of the grill 300. It will be appreciated that a typical grill 300 will have a grate in the middle for holding food items to be cooked. In some embodiments, the grate of the grill 300 may generally align with the bottom surface of the body extension 130 creating a substantially continuous surface upon which to place a food item for cooking, once the grill accessory 100 is inserted into the grill 300.

Figure 4:
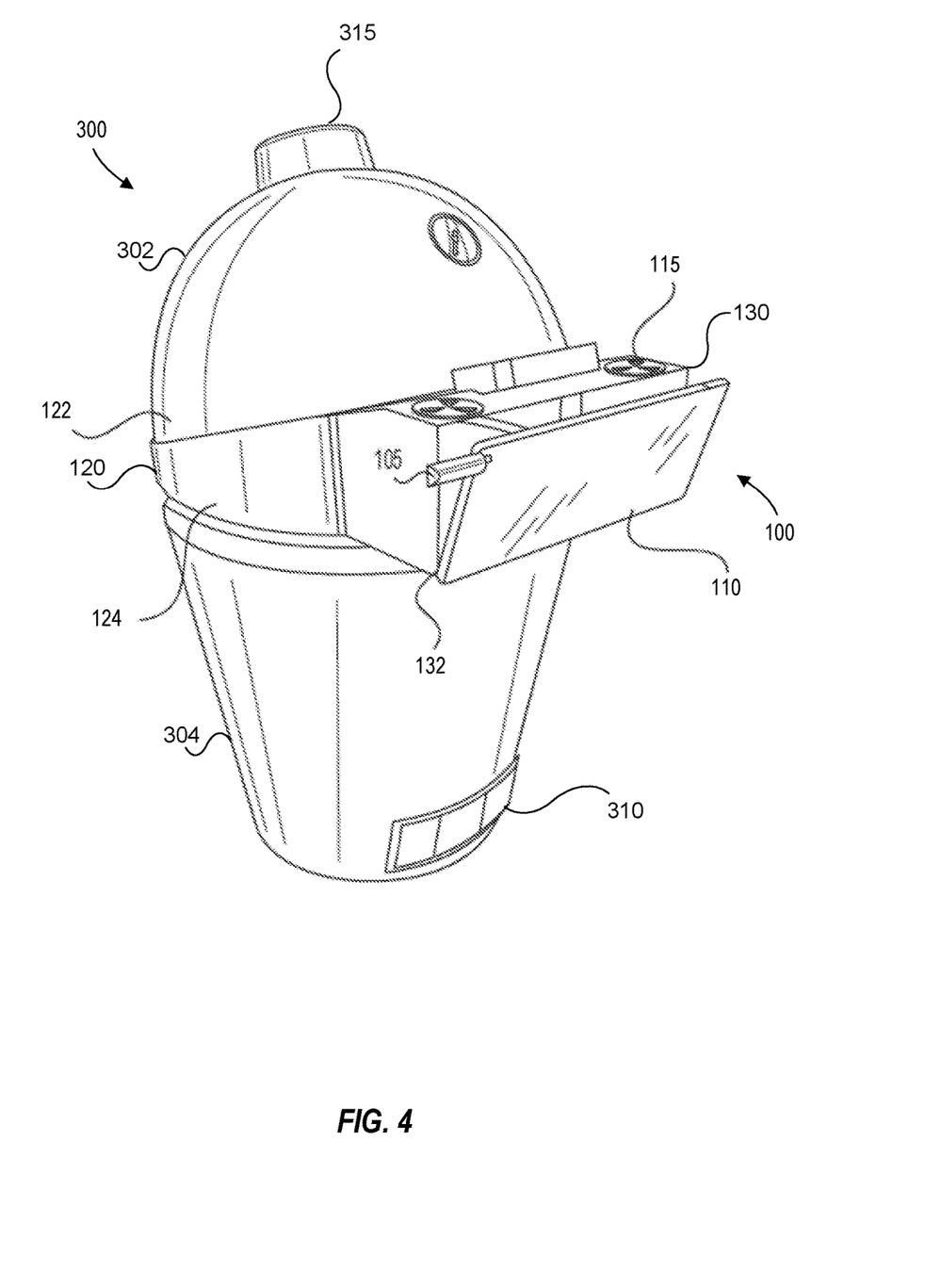
FIG. 4 is another perspective view of a grill accessory in use with a kamado-style grill, in accordance with an example embodiment of the presently disclosed subject matter.

According to some embodiments, once the grill accessory 100 is inserted into the grill 300, the heat and airflow characteristics of the grill 300 may be controlled by adjusting one or more airflow control devices 115 on the grill accessory 100, by for example, opening or closing the one or more airflow control devices 115. In particular, one or more airflow control devices 115 on the body extension 130 of the grill may be opened to cause air to flow from the bottom of the grill 300 up through and around a center grate of the grill and horizontally through the body extension 130. This may allow for heat to be drawn across the top of a food item placed on the grate of the grill 300, instead of the food item only receiving a flow of heat on from on the bottom side of the grate. As shown in FIG. 4, according to some embodiments, the grill 300 may also include an airflow control device 315 at the top of the grill 300 and an airflow control device 310 near that bottom of the grill 300 that may also be used to control the airflow characteristics of the grill 300. For example, lower airflow control 310 at the base of the grill that may be used to increase the airflow into the grill and across or through the heating element (e.g., burning coals). Further, upper airflow control device 315 may be used to direct airflow out of the top of the grill 300. In conventional kamado-style grills, upper and lower airflow control devices 315, 310 are used in tandem to control airflow through the cooking chamber and to increase or decrease temperature. In some embodiments, a user may close the upper airflow control 315 and control the airflow with a combination of the grill accessory 100 airflow control devices 115 and the lower airflow control 310 of the grill 300. Because the grill accessory 100 may allow a user to control the burn rate, it may allow for a longer cooking time for a single batch of fuel. Furthermore, control of the temperature and/or cooking rate may enable preparation of different types of food. For example, lower temperatures may be used for slower cooking (e.g., for thicker pizzas and bread baking) and hotter temperatures may be used for faster cooking (e.g., for a thin Neapolitan pizza, naan, etc.).

As can be seen in FIGS. 3 and 4, in some embodiments, the body extension 130 extends outward and away from the edge of the grill 300. If the door 110 of the body extension 130 is opened, some heat and air will likely exit the grill 300 through the opening created by the door 110, however, the opening created by the door 110 is substantially less than the opening that is created by lifting the lid of the grill 300 or having a device that is continually open. Accordingly, the grill accessory 100 having the door 110 may enable a user to view the state of a cooking food item without releasing a great amount of heat from the grill 300. In some embodiments, a portion of the door 110 may be made of a transparent material, such as glass or heat-resistant Plexiglas, thus allowing a user to view the inside of the grill 300 without opening the door 110.

In some embodiments, the grill 300 may include a thermometer capable of measuring an internal temperature of the grill 300. The thermometer may include a display that is viewable from the outside of the grill 300, such that a user may monitor the internal temperature of the grill. A user can adjust the internal temperature by using the one or more airflow control devices 115, 310, 315 and may be enabled to observe the changes in temperature on the display.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device having:
    a generally ring-shaped body having a side wall that tapers from a first height at a front portion of the body to a second height at a rear portion of the body, the body having i) a bottom surface that is substantially perpendicular to the side wall, the bottom surface configured to engage a rim of a grill, and ii) a top surface that is substantially perpendicular to the side wall, the top surface configured to support a lid hingedly attached to the grill;
    a body extension coupled to the body, the body extension having a top surface, a bottom surface, and first and second side surfaces, all extending generally perpendicularly from the body, and a front face having a hinged door; and
    a first airflow control device positioned on either the first or second side surface of the body extension,
    wherein the device is configured to form a substantially airtight enclosure when the hinged door is in a closed position, the bottom surface is placed on the rim of a grill, and the top surface is supporting the lid hingedly attached to the grill, and
    wherein the first airflow control device is operable to direct a flow of hot air atop a food item to be cooked within the device.

2. The device of claim 1, wherein the first airflow control device has a maximum aperture and is configured for adjustment to any degree of opening between the maximum aperture and being entirely closed.

3. The device of claim 1 further comprising a second airflow control device positioned on either the first or second side surface opposite the first airflow control device.

4. The device of claim 1, wherein the first height is a maximum height and the second height is a minimum height.

5. The device of claim 1, wherein the rim is a rim on the top side of a lower portion of a grill.

6. The device of claim 1, wherein the body extension is generally box-shaped.

7. The device of claim 1, the hinged door having a latch and a handle, and the device capable of being carried vertically when the hinged door and the latch are in closed positions.

8. The device of claim 1, the bottom surface having a perimeter corresponding to a perimeter of the rim of the grill and the top surface having a perimeter corresponding to a perimeter of the lid.

9. The device of claim 1, the body having a profile that is selected from the group comprising C-channel, Z-channel, and I-channel.

10. A system comprising:
a kamado-style grill having a cooking surface, a body including a bottom portion with a top rim, and a lid having a bottom rim, the lid being hingedly attached to the bottom portion, wherein, when in a partially open position, the lid forms a gap spanning the space between the top rim of the bottom portion and the bottom rim of the lid; and
a grill insert removably positioned between the bottom portion of the grill and the lid of the grill, the grill insert comprising:
a body comprising (i) a continuous wall that defines a hollow interior, the body being shaped to substantially occupy the gap of the grill, (ii) a bottom surface that is substantially perpendicular to the wall, the bottom surface configured to engage the top rim of the bottom portion and (iii) a top surface that is substantially perpendicular to the wall, the top surface configured to support the bottom rim of the lid;
a body extension coupled to the body, the body extension comprising a hollow enclosure extending outward from the body and beyond a front face of the grill, the body extension comprising a front face having (i) an aperture and (ii) a door that may be selectively opened, to provide access to the hollow interior and the cooking surface via the aperture, and closed; and
an airflow control device positioned on a side surface of the body extension, wherein the airflow control device is each operable to allow a flow of hot air atop a food item to be cooked within the system.

11. The system of claim 10, wherein the airflow control device is an adjustable vent.

12. The system of claim 10, wherein the door is hingedly attached to a bottom surface of the body extension.

13. The system of claim 10, wherein the bottom portion of the grill and/or the lid of the grill include one or more airflow control devices.

14. The system of claim 10, wherein the grill includes a thermometer for measuring an internal temperature of the grill, and wherein a reading of the thermometer is viewable from the exterior of the grill.

15. A method of cooking a food item, the method comprising:
raising a hinged lid of a grill, the grill having a cooking surface and a lower portion with a top rim, and the hinged lid having a lower rim defining an aperture;
igniting a fuel source within the grill;
placing a lower surface of a grill insert onto the top rim of the lower portion of the grill such that a portion of the entire perimeter of the top rim is covered by a lower surface of the grill insert, the lower surface of the grill insert being substantially perpendicular to a wall of the insert, a body extension coupled to the body, the body extension comprising a hollow enclosure extending outward from the body and beyond a front face of the grill, the body extension comprising a front face having (i) an aperture and (ii) a door that may be selectively opened, to provide access to the hollow interior and the cooking surface via the aperture, and closed;
lowering the hinged lid of the grill until a portion of the entire perimeter of the lower rim of the lid abuts an upper surface of the grill insert, the upper surface of the grill insert being substantially perpendicular to a wall of the insert, wherein the grill insert substantially occupies the space between the top rim of the lower portion of the grill and the lower rim of the lid;
opening the door on the front face of the body extension, the door providing access to the cooking surface;
inserting a food item into the grill through the open door such that the food item is exposed to heat created by the burning fuel source;
closing the door of the grill insert; and
adjusting an airflow control device positioned on a side face of the body extension to allow air to flow from the bottom of the grill, across a top surface of the food item, and out of the airflow control device.

16. The method of claim 15 further comprising adjusting a front airflow control device positioned on a face of the grill insert to allow air to flow upwards from the bottom of the grill, across a top surface of the food item, and out of the airflow control device.

* * * * *